(12) United States Patent
Choi et al.

(10) Patent No.: US 10,061,594 B2
(45) Date of Patent: Aug. 28, 2018

(54) PROTECTING AND VERIFYING CONTENTS OF FILES ON MOBILE COMPUTING DEVICES

(71) Applicant: Verizon Patent and Licensing Inc., Arlington, VA (US)

(72) Inventors: Young Rak Choi, Belle Mead, NJ (US); Mauricio Pati Caldeira de Andrada, South Plainfield, NJ (US); Samir S Vaidya, Highland Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 258 days.

(21) Appl. No.: 15/017,601

(22) Filed: Feb. 6, 2016

(65) Prior Publication Data
US 2017/0228235 A1 Aug. 10, 2017

(51) Int. Cl.
| G06F 9/44 | (2018.01) |
| G06F 3/06 | (2006.01) |
| G06F 9/4401 | (2018.01) |
| G06F 21/57 | (2013.01) |

(52) U.S. Cl.
CPC .......... *G06F 9/4401* (2013.01); *G06F 21/575* (2013.01)

(58) Field of Classification Search
CPC ..................................... G06F 9/44; G06F 3/06
See application file for complete search history.

(56) References Cited

U.S. PATENT DOCUMENTS

| 2007/0198851 A1* | 8/2007 | Goto ..................... G06F 12/145 713/187 |
| 2014/0258700 A1* | 9/2014 | England ................ G06F 21/572 713/2 |
| 2015/0032996 A1* | 1/2015 | Koeberl ................ G06F 9/3802 712/205 |
| 2016/0125187 A1* | 5/2016 | Oxford ................. G06F 21/575 713/2 |
| 2016/0182238 A1* | 6/2016 | Dewan .................. H04L 9/3263 713/171 |

* cited by examiner

*Primary Examiner* — Phil Nguyen (57) ABSTRACT

A method is provided for operating a computing device, the method including verifying the contents of a protected portion of a nonvolatile memory included in the computing device, the protected portion including a first protected file that includes first instructions; in response to the protected portion being successfully verified, initiating execution of an operating system kernel, on the computing device, included in a boot portion of the nonvolatile memory, wherein the boot portion is configured to cause the computing device to execute instructions stored in a system portion of the nonvolatile memory under control of the kernel, and the system portion is not included in the protected portion; subsequent to initiating execution of the kernel, locating the first instructions via a first symbolic link to the first protected file, wherein the first symbolic link is stored in one of the system portion or the boot portion; and executing the first instructions under control of the kernel.

20 Claims, 7 Drawing Sheets

PROTECTING AND VERIFYING CONTENTS OF FILES ON MOBILE COMPUTING DEVICES

BACKGROUND

Computing devices such as, for example, mobile communication devices are typically equipped with an operating system that manages hardware and software resources of the computing device. At the time of initialization of a computing device, for example at power-up, a boot (or "boot-up" or "booting") process initiated by hardware or software is performed by a one or more processors included in the computing device. During the boot process, a bootloader may load the operating system or some other system software for the computing device after completion of initial power-up operations.

Some computing devices execute some version of the Android® operating system. Such devices include a nonvolatile memory containing the state of the operating system. The nonvolatile memory may include default components (which may be referred to, and/or stored as, "image files") such as, but not limited to, a bootloader image, a boot image, a system image, a recovery image, a modem image, a user-data image, and a cache image.

The bootloader may be one of the first things executed when an Android mobile device is booted. The bootloader includes instructions to boot an operating system kernel (the core or main component of the operating system), which may be included in a boot image portion of the nonvolatile memory. The bootloader is typically locked to prevent replacement of the operating system kernel and/or other information stored in the boot image portion. Replacement of the operating system kernel can be done after the bootloader is unlocked.

Some enterprise users, such as organizations that provide their services via mobile devices, may need specific features (e.g., the enterprise users' own firmware/software build) to be introduced into the nonvolatile memory. These enterprise users may need to unlock the bootloader to disable specific features of a stock collection of images provided by an equipment manufacturer or mobile service provider, and modify or add their own features into the Android system for their particularized use (such as, but not limited to, disabling phone calls, SMS, or a built-in camera). However, conventionally, service providers and/or equipment manufacturers generally have not wished to allow bootloader unlocking and custom components to be loaded on their Android devices, for security reasons, or for protecting and verifying the integrity of information such as assets and customer information.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 8 and 9 provide functional block illustrations of general purpose computer hardware platforms.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

Figure 1A:
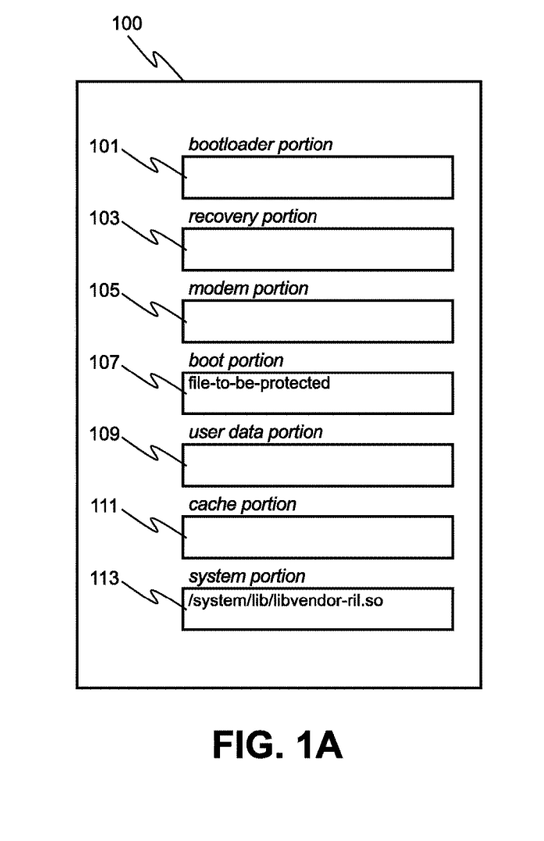
FIG. 1A illustrates a diagram of conventional contents of a nonvolatile memory for an Android computing device.

Reference now is made in detail to the examples illustrated in the accompanying drawings and discussed below. FIG. 1A illustrates a diagram of conventional contents of a nonvolatile memory 100 for an Android computing device. The illustrated positions of portions 101-113 of nonvolatile memory 100 does not indicate any particular arrangement or relative sizes of portions 101-113. In a secure boot implementation involving such a nonvolatile memory, when a computing device powers up, a Boot ROM (comprising instructions which may be stored in an immutable read-only memory of the computing device, and which is not illustrated in FIG. 1A) accesses the bootloader portion 101 (which may also be referred to as a "bootloader image" or "bootloader") of nonvolatile memory 100. In some implementations, the Boot ROM verifies the integrity of the contents of bootloader portion 101. For example, verification may be performed by executing a cryptographic signature verification algorithm implemented by instructions included in the Boot ROM. Failed verification of the bootloader portion may result in the boot process being interrupted, such as by terminating the boot process. In some implementations, the Boot ROM loads a bootloader software program, comprising a plurality of instructions, from bootloader portion 101 into a volatile memory included in the computing device and executes the bootloader.

The bootloader may be configured to verify other portions of the nonvolatile memory 100, such as the recovery portion 103 (which may also be referred to as a "recovery image," and which may provide a limited boot mode for clearing and/or restoring portions of the nonvolatile memory), modem portion 105 (which may also be referred to as a "modem image," and may include firmware for modem/baseband hardware included in the computing device), boot portion 107 (which may also be referred to as a "boot image," include an operating system kernel, and be configured to cause the computing device to execute instructions included in system portion 113 under control of the kernel), user data portion 109 (which may also be referred to as "userdata"), cache portion 111, and system portion 113

(which may also be referred to as a "system image," and include program instructions, such as but not limited to application programs, for execution under control of the kernel) illustrated in FIG. 1A. To allow an enterprise user's custom build to be executed on the computing device, the behavior of the bootloader needs to be changed to not verify some portions (mainly the boot portion 107) through a certain process. This change is referred to as bootloader unlocking and after this change, the bootloader is typically left in an "unlocked" state until it is "locked" again. In some implementations, whether a bootloader is considered locked or unlocked may be stored as a "lock bit" stored in bootloader portion 101.

Figure 1B:
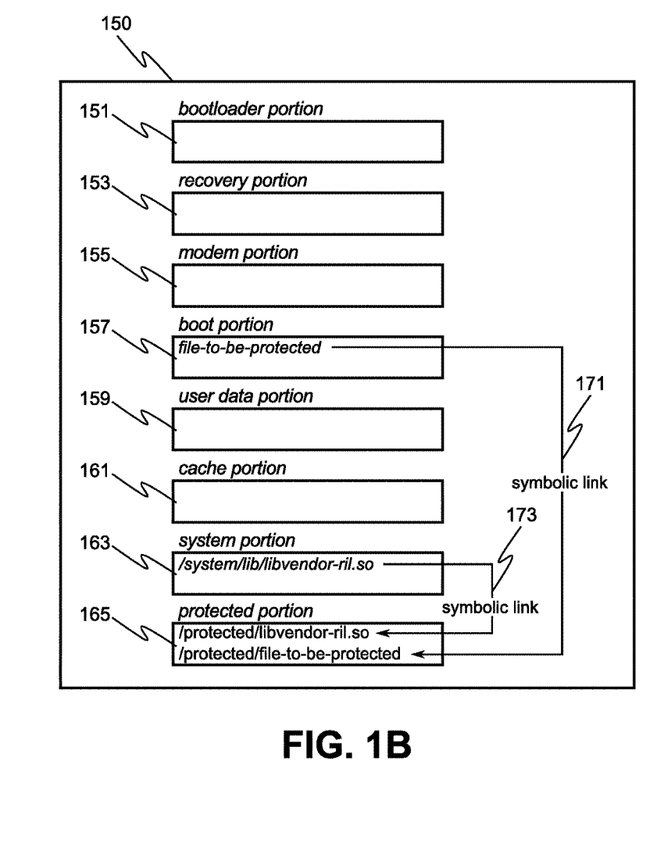
FIG. 1B illustrates a diagram of contents of a nonvolatile memory, according to an implementation of the subject matter of this application.

FIG. 1B illustrates a diagram of contents of a nonvolatile memory 150, according to an implementation of the subject matter of this application. The illustrated positions of portions 151-165 of nonvolatile memory 150 does not indicate any particular arrangement or relative sizes of portions 151-165. Even if the bootloader is unlocked, it may still be desired for some of the portions 153, 155, 157, 159, 161, and 163 of nonvolatile memory 100 to be verified to ensure that changes introduced by a custom build do not negatively impact the service provider network from providing network services to the mobile device and maintain the integrity of certain basic security measures ordinarily provided by the computing device. Towards this end, it is desirable, even on an "unlocked" device, to verify the contents of bootloader portion 151, modem portion 155, and recovery portion 153. In addition, it may also be desired that some files in the system portion 163 (the contents of which are not verified, whether the bootloader is locked or unlocked) and/or boot portion 157 (the contents of which are not verified when the bootloader is unlocked) which are considered to be of particular interest to the service provider network and/or security measures implemented by the computing device (for example, a vendor RIL (radio interface layer)) are also verified.

As illustrated in FIG. 1B, during an image build process, protected files for which verification of the integrity of their contents is desired such as, for example, the library "libvendor-ril.so" (containing instructions to be executed under control of the operating system kernel) in the system portion 163 and the "file-to-be-protected" in the boot portion 157 can be omitted or removed from the system portion 163 and boot portion 157 respectively. Examples of the files omitted or removed from the system portion (illustrated with the label "libvendor-ril.so" in FIG. 1B) include, but are not limited to, loadable kernel modules, shared objects, libraries, executable programs, applications, apps, and configuration files. Examples of the files moved from the boot portion (illustrated with the label "file-to-be-protected" in FIG. 1B) include, but are not limited to, a compressed or uncompressed kernel, an initramfs (or "initial RAM filesystem"), and a configuration file. A separate protected portion 165 of the nonvolatile memory 150 can be created and the removed or omitted files can be stored in the protected portion 165 as protected files (illustrated by the files "/protected/libvendor-ril.so" and "/protected/file-to-be-protected" in FIG. 1B). Protected portion 165 may be implemented with, for example, a file system image or a partition containing a file system, such as, but not limited to, an ext2, ext3, ext4, JFFS2, F2FS, cramfs, squashfs, or YAFFS2 file system.

Figure 2:
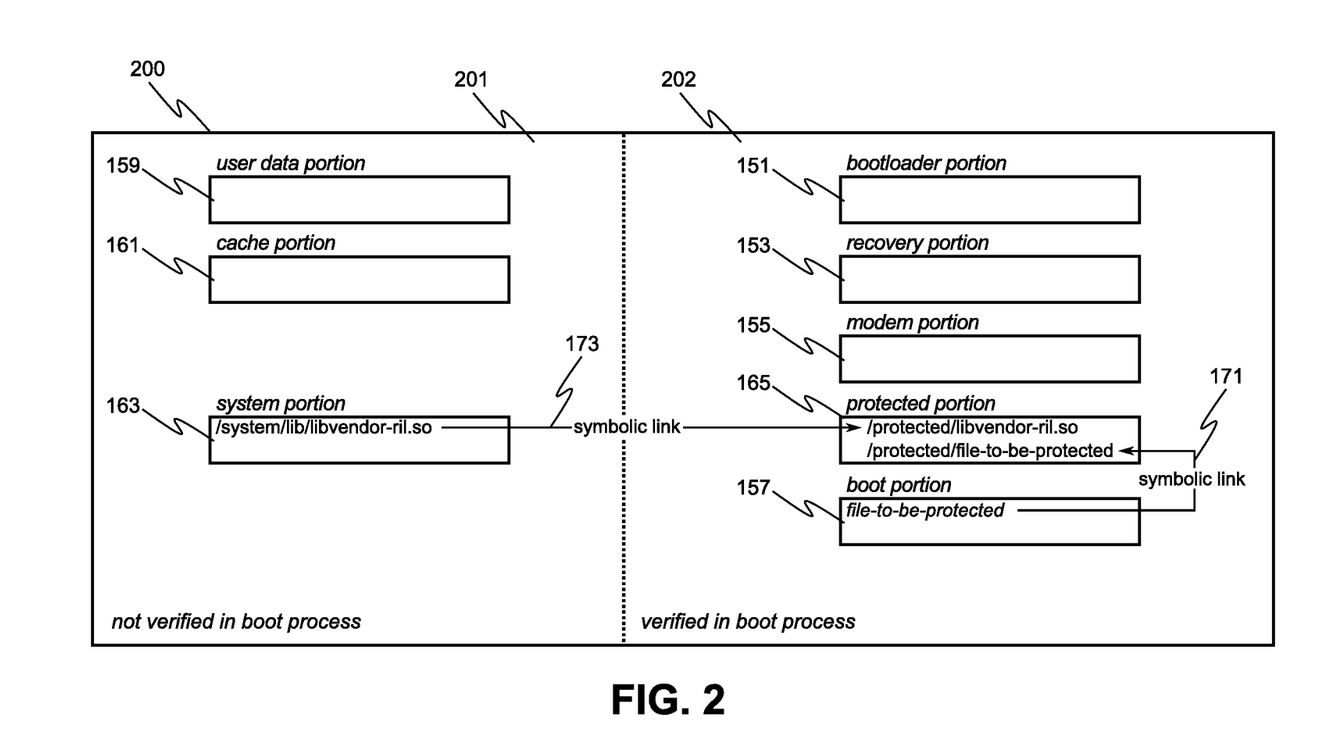
FIG. 2 illustrates an example in which a bootloader portion included in a nonvolatile memory is in a "locked" state.
Figure 3:
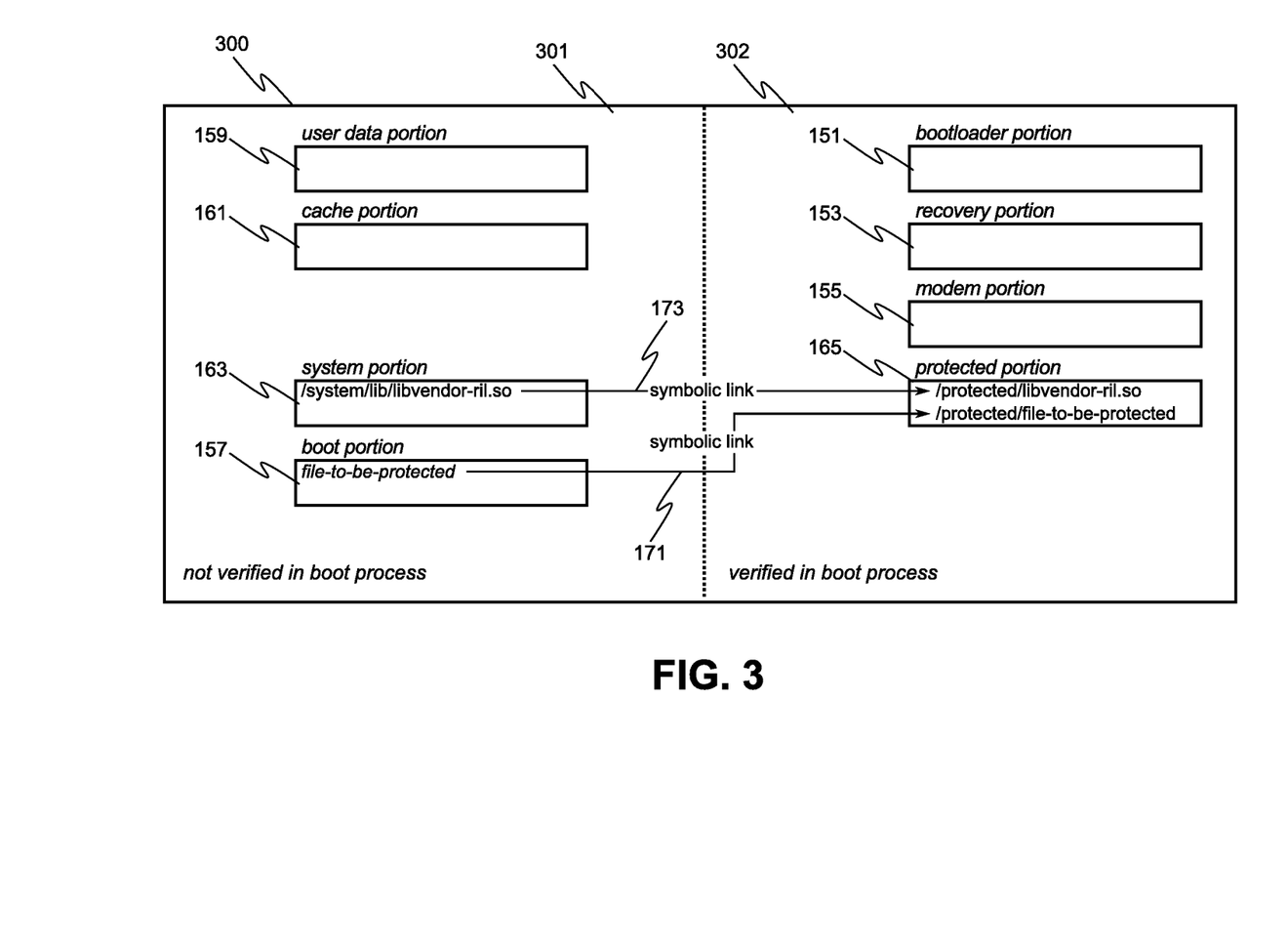
FIG. 3 illustrates an example in which a bootloader portion included in a nonvolatile memory is in a "unlocked" state.

In the boot portion 157 and the system portion 163, the removed or omitted files can be replaced by symbolic links 171 and 173 (which may also be referred to as "symlinks" or "soft links") respectively, to point to the removed or omitted files in the protected image 165 to allow the operating system to locate these files by following their respective symbolic links. To record symbolic links 171 and 173, boot portion 157 and system portion 163 may each be implemented using a file system that supports recording symbolic links, such as, but not limited to, ext2, ext3, ext4, JFFS2, F2FS, cramfs, squashfs, and YAFFS2. Such filesystems are readily available via a Unix-like operating system, such as Linux, FreeBSD, and MacOSX, and may be recorded via a "symlink" system call, a "vfs_symlink" kernel method, and/or a "ln" command line program. The NTFS file system also supports recording symbolic links, such as by use of the "mklink" command. During a boot-up process, the protected image 165 can also be verified similar to bootloader image 151, modem image 155, and recovery image 153. For example, a cryptographic signature verification algorithm, as discussed with respect to bootloader portion 101, may be used to verify the contents of protected image 165. Although FIGS. 1B, 2, and 3 illustrate examples with one symbolic link 171 from boot portion 157 to protected portion 165 and one symbolic link 173 from system portion 163 to protected portion 165, this is merely an illustrative example. Each of boot portion 157 and system portion 163 may include zero or more such symbolic links to protected portion 165.

During a boot-up process, execution of the operating system kernel included in boot portion 157 is initiated on one or more processors included in the computing device. The kernel can create the symbolic links 171 and 173 to the protected files in their required directories to refer to the actual files stored in the protected portion 165 such that no changes are required in other modules or files which refer to the protected files. For example, the kernel may be configured to create or recreate symbolic links 171 and 173 in the event that they are not present in their respective portions 157 and 163 or do not reference the correct files in protected portion 165. The bootloader portion 151 or boot portion 157 may likewise be configured to create or recreate symbolic links 171 and 173. Since custom ROM modules or files (e.g., introduced by enterprise users) may include their own modules or files for the protected files, the protected files may not be publically available. In such cases custom ROM guidelines may be provided. Therefore, when an enterprise user creates an Android custom build, the protected files may not be included in the Android custom build.

It is possible that symbolic links 171 and 173 might be changed, broken, or removed by, for example, a process with root user, or superuser, authority (e.g., an administrator) of the computing device. Root user authority can be obtained, in some circumstances, via a process known as "rooting" or "jailbreaking" a computing device, which enables a user of the computing device to attain and exercise privileged control (known as root access) over various subsystems of the computing device. To prevent such changes to symbolic links 171 and 173, an enterprise user's custom build may be configured to not provide such access to a root user, or any other user, by use of an access control policy stored in the nonvolatile memory which indicates the symbolic links 171 and 173 are not to be removed or modified by any user, including the root user. The access control policy to the symbolic links can be defined in a security policy for the computing device. For example, a Linux-based kernel may be configured to enforce the access control policy by use of an SELinux (Security-Enhanced Linux) kernel security module, which provides mechanisms supporting access control security policies. In the event that the computing device detects a violation or an attempted violation of the access control policy, this can result in the computing device modifying a nonvolatile memory element included in the computing device to set a flag (which may be implemented, for example, with a "tamper bit" stored in bootloader portion 151). The bootloader may be configured to checks this flag during a boot process. If the flag is set, the bootloader may be configured to interrupt the boot process, such as by stopping the boot process or displaying a warning message to the user and waiting for user's further action (e.g., receiving an handling a user instruction to proceed with the boot process despite any associated risk or stop the boot process).

FIG. 2 illustrates an example in which the bootloader portion 151 included in the nonvolatile memory 200 is in a "locked" state. In cases where the bootloader portion 151 is locked, a secure boot process is performed, in which the contents of bootloader portion 151, recovery portion 153, modem portion 155, boot portion 157, and protected portion 165 are each verified as part of a boot process, such as by performing cryptographic signature verification for each of the portions included in verified portion 202 of nonvolatile memory 200. As a result, the contents of the protected files included in protected portion 165 (such as the protected files /protected/libvendor-ril.so and /protected/file-to-be-protected illustrated in FIG. 2) are verified as part of the boot process. However, the portions included in unverified portion 201 of the nonvolatile memory 200, including user data portion 159, cache portion 161, and system portion 163, may not be verified as part of the boot process. The protected image 165 and the symbolic links 171 and 173 ensure that the protected files stored within the protected image 165 are verified and protected against unauthorized changes.

FIG. 3 illustrates an example in which the bootloader portion 151 included in the nonvolatile memory 300 is in an "unlocked" state. In some cases, a preloaded locked bootloader can be unlocked by a user of the computing device through an unlocking process maintained by a service provider associated with the computing device. In some other cases, bulk unlocking of multiple mobile devices may be required. For example, an enterprise may require to unlock the mobile devices belonging to the enterprise. In such cases, unlocked bootloaders may be preloaded in the mobile devices. When such a mobile device is returned to the service provider, the service provider may refurbish the returned device with a locked boot-loader. To maintain control in a case in which an enterprise sells used unlocked computing devices directly to other markets, the service provider may ensure that the unlocked computing devices may be used only with the enterprise accounts based on SKU or IMEI.

In cases where the bootloader is unlocked, a secure boot process is still performed, in which the contents of bootloader portion 151, recovery portion 153, modem portion 155, and protected portion 165 are each verified as part of a boot process, such as by performing cryptographic signature verification for each of the portions included in verified portion 302 of nonvolatile memory 300. As a result, the contents of the protected files included in protected portion 165 (such as the protected files /protected/libvendor-ril.so and /protected/file-to-be-protected illustrated in FIG. 2) are verified as part of the boot process. However, the portions included within unverified portion 301 of the nonvolatile memory 300, including the user data portion 159, the cache portion 161, the system portion 163, and the boot portion 157 may not be verified as part of the boot process. The protected image 165 and the symbolic links 171 and 173 ensure that the contents of protected files stored within the protected image 165 are verified and protected against unauthorized changes.

Figure 4:
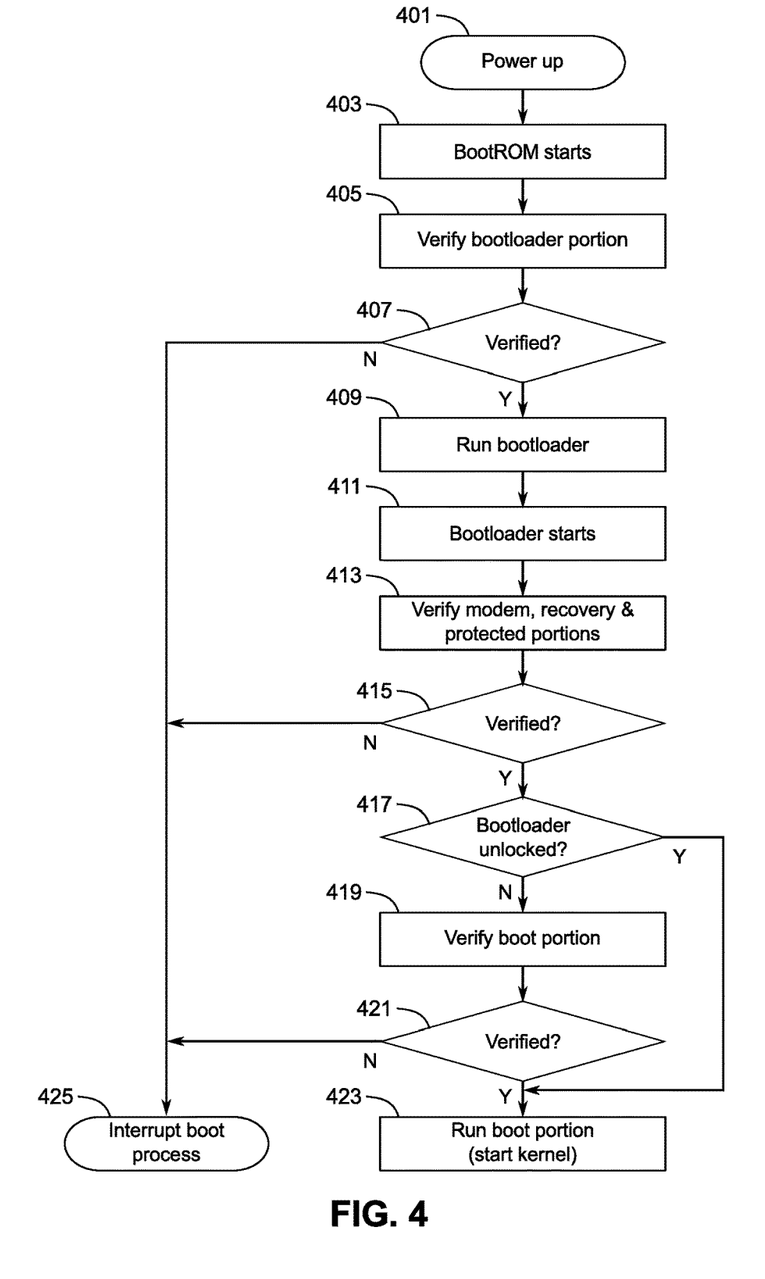
FIG. 4 illustrates an exemplary boot-up process of a computing device, according to an implementation.

FIG. 4 illustrates an exemplary boot-up process 400 of a computing device, according to one implementation. At block 401 the computing device is powered up. Power up may be initiated by, for example, pressing a power button, or by a processor or hardware module included in the computing device. Upon power up, at block 403 one or more processors included in the computing device initiate execution of a Boot ROM. In some implementations, the Boot ROM is permanently and immutably recorded into a memory, which may be included within a processor package. For example, the Boot ROM may be implemented using a mask ROM, or by a "write once" memory. Among other things, the Boot ROM, at block 405, verifies the integrity of the contents of bootloader portion 151 of a nonvolatile memory included in the computing device, such as nonvolatile memories 150, 200, and 300 discussed above. As discussed above, such verification may involve verifying that the contents of bootloader portion 151 correctly correspond with a respective cryptographic digital signature. For example, a cryptographic hash (such as, but not limited to, SHA-1 or SHA256) of the contents of bootloader 151 may be calculated and signed with a private key (using the RSA public-key cryptosystem), and the Boot ROM may include a copy of a corresponding public key effective for verifying the signature.

In response to determining, at block 407, that the contents of bootloader portion 151 were not successfully verified (suggesting that the integrity of bootloader 151 has been compromised), at block 425 the boot process 400 is interrupted. The interruption of the boot process may result in the boot process being automatically terminated, or the computing device may prompt the user whether to continue the boot process despite the verification failure. If the user chooses to continue the boot process, it may resume at block 409. In response to determining, at block 407, that bootloader portion 151 has been successfully verified, at block 409 one or more processors included in the computing device initiate execution of instructions included in the bootloader portion 151, such as a program commonly referred to as a "bootloader." The bootloader starts at block 411, and among other things the bootloader, at block 413, verifies the integrity of the contents of modem portion 155, recovery portion 153, and protected portion 165 (where such portions are included in the nonvolatile memory). In some implementations, the contents of each verified portion may be verified against respective cryptographic digital signatures. In some implementations, a single cryptographic digital signature may be used to verify two or more of the portions 153, 155, and 165. In some implementations, a cryptographic hash or a cryptographic digital signature for one or more of portions 153, 155, and 165 may be included in bootloader portion 151, and used to verify the integrity of its respective portion or portions.

In response to determining, at block 415, that the contents of any of portions 153, 155, and 165 were not successfully verified, at block 425 the boot process is interrupted. The interruption of the boot process may result in the boot process being automatically terminated, or the computing device may prompt the user whether to continue the boot process despite the verification failure. If the user chooses to continue the boot process, it may resume at block 417. In response to determining, at block 415, that the contents of portions 153, 155, and 165 have been successfully verified, at block 417 the computing device determines whether the bootloader is unlocked.

In response to determining, at block 417, that the bootloader is not unlocked (as illustrated in FIG. 2), at block 419 the bootloader verifies the integrity of the contents of boot portion 157. In some implementations, the contents of boot portion 157 may be verified against a respective cryptographic digital signature. In some implementations, a cryptographic hash or a cryptographic digital signature for boot portion 157 may be included in bootloader portion 151, and used to verify the integrity of boot portion 157. In response to determining, at block 421, that the contents of boot portion 157 were not successfully verified, at block 425 the boot process is interrupted. The interruption of the boot process may result in the boot process being automatically terminated, or the computing device may prompt the user whether to continue the boot process despite the verification failure. If the user chooses to continue the boot process, it may resume at block 423. In response to determining, at block 421, that the contents of boot portion 157 were successfully verified, at block 423 one or more processors included in the computing device may run instructions included in the boot portion 157 such as, for example, instructions for an operating system kernel. In response to determining, at block 417, that the bootloader is unlocked (as illustrated in FIG. 3), at block 423 one or more processors included in the computing device may run instructions included in the boot portion 157 such as, for example, instructions for an operating system kernel, without first performing the verification of boot portion 157 at block 419. The boot portion 157 and/or the kernel included therein may be configured to execute instructions included in the system portion 163 under control of the kernel.

It is noted that although FIG. 4 illustrates an example in which verification of the boot portion 157 (at block 419) is performed after verification of the modem portion 155, recovery portion 153, and protected portion 165 (at block 413), this order may be reversed or otherwise changed. For example, boot-up process 400 may be modified such that the 'Y' branch from block 407 may continue to block 417, the 'Y' branch from block 417 may continue to block 409, the 'Y' branch of block 421 may continue to block 409, and the 'Y' branch of block 415 may continue to block 423.

Figure 5:
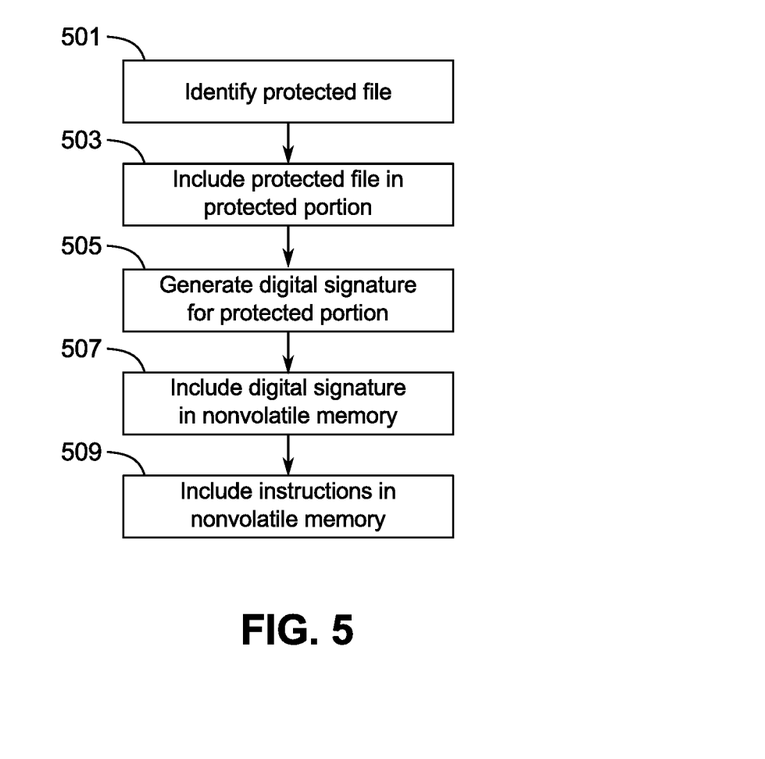
FIG. 5 illustrates an example process for configuring a computing device.

FIG. 5 illustrates an example process for configuring a computing device. At block 501, files, such as the files/system/lib/libvendor-ril.so and file-to-be-protected illustrated in FIGS. 2 and 3, are identified as protected files requiring cryptographic verification or other verification as part of a boot process for the computing device. At block 503, action is taken which causes the protected files to be stored in a protected portion of a nonvolatile memory included in the computing device, such as protected portion 165 illustrated in FIGS. 2 and 3. For example, instructions may be provided to and executed by the computing device which cause the protected files to be moved from an initial location outside of the protected portion to respective locations in the protected portion. As another example, the computing device may be provided with data (such as a "protected image") that is stored in its nonvolatile memory as, or as part of, the protected portion of the nonvolatile memory. At block 505, a cryptographic signature and/or other verification data is generated for the protected portion. With the protected files included in the protected portion, the cryptographic signature and/or other verification data is generated based on the contents of the protected files. At block 507, action is taken which causes the cryptographic signature and/or other verification data to be stored in the nonvolatile memory. For example, instructions may be provided to and executed by the computing device to generate and store the cryptographic signature and/or other verification data as part of the protected portion or another portion of the nonvolatile memory. As another example, the cryptographic signature and/or other verification data may be generated outside of the computing device and provided to the computing device for storage in the protected portion or another portion of the nonvolatile memory. At block 509, action is taken which causes instructions to be stored in the nonvolatile memory which, when executed by the computing device, cause the computing device to verify the contents of the protected portion based on the cryptographic signature and/or other verification data; in response to the protected portion being successfully verified, initiate execution of an operating system kernel, on the computing device, included in a boot portion of the nonvolatile memory, wherein the boot portion of the nonvolatile memory is configured to cause the computing device to execute instructions stored in a system portion of the nonvolatile memory under control of the kernel, and the system portion is not included in the protected portion or the boot portion; and subsequent to initiating execution of the kernel, locate one or more of the protected files via respective symbolic links to the protected files, wherein the first symbolic link is stored in one of the system portion or the boot portion of the nonvolatile memory. For example, such instructions may be included in data provided to the computing device for storage in its nonvolatile memory, such as in the boot portion and/or system portion of the nonvolatile memory.

The structure, programming and operations of the various types of mobile devices are well known. However, for completeness, it may be useful to consider the functional elements/aspects of two exemplary mobile devices, at a high-level.

Figure 6:
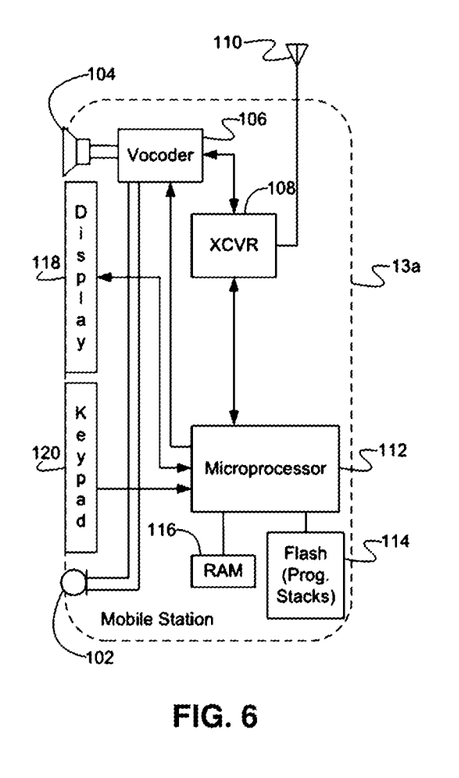
FIG. 6 is a high-level functional block diagram of an exemplary non-touch type mobile device that may utilize the protecting and verifying contents of protected files.

For purposes of such a discussion, FIG. 6 is a high-level functional block diagram of an exemplary non-touch type mobile device that may utilize the protecting and verifying contents of protected files. Although the mobile device may be a smart-phone or may be incorporated into another device, such as a personal digital assistant (PDA) or the like, for discussion purposes, the illustration shows the mobile device is in the form of a handset. The handset implementation of the mobile device functions as a normal digital wireless telephone station. For that function, the station includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset also includes at least one digital transceiver (XCVR) 108. Today, the handset would be configured for digital wireless communications using one or more of the common network technology types. The concepts discussed here encompass implementations of the mobile device utilizing any digital transceivers that conform to current or future developed digital wireless communication standards. The mobile device may also be capable of analog operation via a legacy network technology.

The transceiver 108 provides two-way wireless communication of information, such as vocoded speech samples and/or digital information, in accordance with the technology of the network 109. The transceiver 108 also sends and receives a variety of signaling messages in support of the various voice and data services provided via the mobile device and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device includes a display 118 for displaying messages, menus or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course, other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the process for protecting and verifying contents of protected files.

A microprocessor 112 serves as a programmable controller for the mobile device, in that it controls all operations of the mobile device in accord with programming that it executes, for all normal operations, and for operations involved in the protecting and verifying contents of protected files under consideration here. In the example, the mobile device includes flash type program memory 114, for storage of various "software" or "firmware" program routines and mobile configuration settings, such as mobile directory number (MDN) and/or mobile identification number (MIN), etc. The mobile device may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

Figure 7:
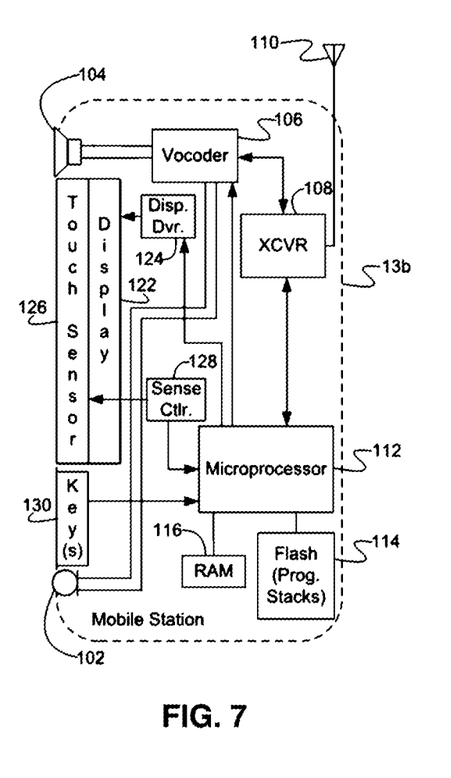
FIG. 7 is a high-level functional block diagram of an exemplary touch screen type mobile device that may utilize the protecting and verifying contents of protected files.

For purposes of such a discussion, FIG. 7 is a high-level functional block diagram of an exemplary touch screen type mobile device that may utilize the protecting and verifying contents of protected files. Although possible configured somewhat differently, at least logically, a number of the elements of the exemplary touch screen type mobile devices are similar to the elements of the mobile device of FIG. 6, and are identified by like reference numbers in FIG. 7. For example, the touch screen type mobile device includes a microphone 102, speaker 104 and vocoder 106, for audio input and output functions, much like in the earlier example. The mobile devices also include at least one digital transceiver (XCVR) 108, for digital wireless communications, although the handset may include an additional digital or analog transceiver. The concepts discussed here encompass implementations of the mobile devices utilizing any digital transceivers that conform to current or future developed digital wireless communication standards. As in the mobile device of FIG. 6, the transceiver 108 provides two-way wireless communication of information, such as vocoded speech samples and/or digital information, in accordance with the technology of the network 109. The transceiver 108 also sends and receives a variety of signaling messages in support of the various voice and data services provided via the mobile devices and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of FIG. 6, a microprocessor 112 serves as a programmable controller for the mobile devices, in that it controls all operations of the mobile devices in accord with programming that it executes, for all normal operations, and for operations involved in the procedure for protecting and verifying contents of protected files under consideration here. In the example, the mobile device includes flash type program memory 114, for storage of various program routines and mobile configuration settings. The mobile device may also include a non-volatile random access memory (RAM) 116 for a working data processing memory. Of course, other storage devices or configurations may be added to or substituted for those in the example. Hence, outlined above, the mobile device includes a processor, and programming stored in the flash memory 114 configures the processor so that the mobile device is capable of utilizing protecting and verifying contents of protected files.

In the example of FIG. 6, the user interface elements included a display and a keypad. The mobile devices may have a limited number of key 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface allows a user to interact directly with the information presented on the display.

Hence, the exemplary mobile device includes a display 122, which the microprocessor 112 controls via a display driver 124, to present visible outputs to the device user. The mobile devices also include a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile devices. The microphone 102 and speaker 104 may be used as additional user interface elements, for audio input and output, including with respect to some functions related to the protecting and verifying contents of protected files.

The structure and operation of the mobile devices, as outlined above, were described by way of example, only. As shown by the above discussion, functions relating to the protecting and verifying contents of protected files, via a graphical user interface of a mobile device may be implemented on computers connected for data communication via the components of a packet data network. Although special purpose devices may be used, such devices also may be implemented using one or more hardware platforms intended to represent a general class of data processing device commonly used to run "server" programming so as to implement the protecting and verifying contents of protected files functions discussed above, albeit with an appropriate network connection for data communication.

As is generally known, general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for protecting and verifying contents of protected files. The software code is executable by the general-purpose computer that functions as the gateway for protecting and verifying contents of protected files and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for protecting and verifying contents of protected files, in essentially the manner performed in the implementations discussed and illustrated herein.

Figures 8, 9:
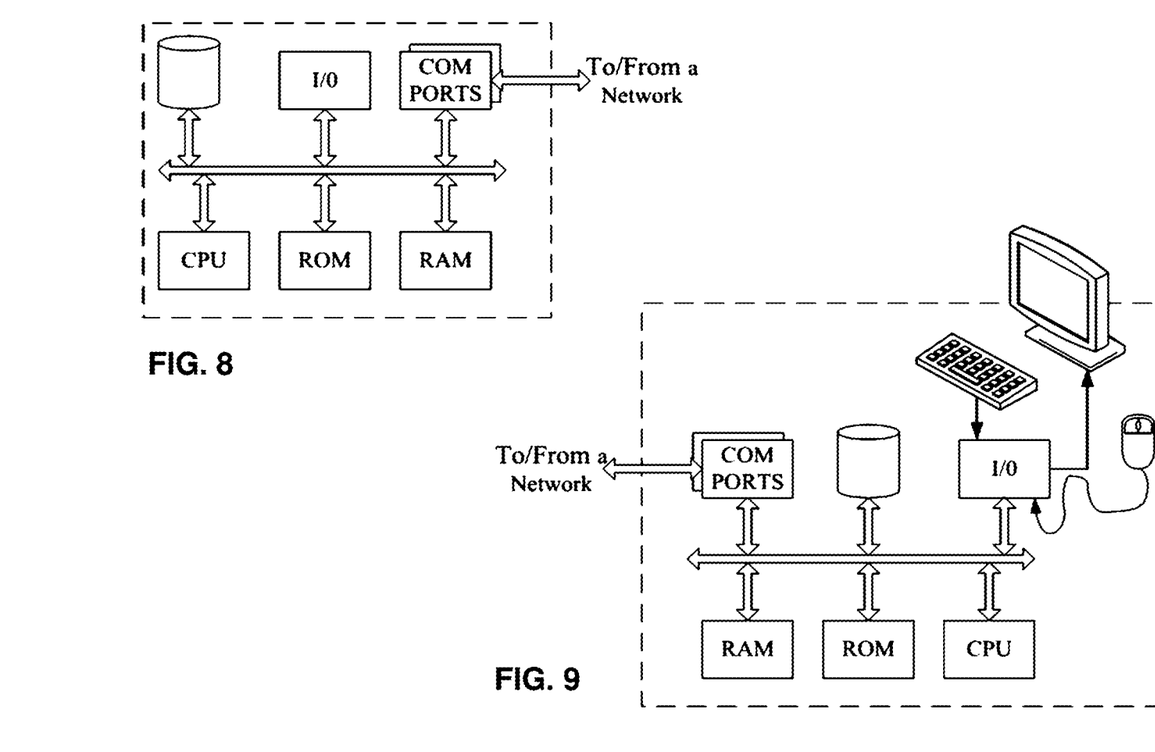
FIG. 8 illustrates a network or host computer platform.
FIG. 9 depicts a computer with user interface elements.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. The structure, programming and general operation of such computer equipment are well known and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing protecting and verifying contents of protected files outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement protecting and verifying contents of protected files, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the technology to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method of operating a computing device, the method comprising:
    verifying the contents of a protected portion of a nonvolatile memory included in the computing device, the protected portion including a first protected file that includes first instructions;
    in response to the protected portion being successfully verified, initiating execution of an operating system kernel, on the computing device, included in a boot portion of the nonvolatile memory, wherein the boot portion is configured to cause the computing device to execute instructions stored in a system portion of the nonvolatile memory under control of the operating system kernel, and the system portion is not included in the protected portion or the boot portion;
    subsequent to initiating execution of the operating system kernel, locating the first instructions via a first symbolic link to the first protected file, wherein the first symbolic link is stored in one of the system portion or the boot portion;
    causing the operating system kernel to create the first symbolic link in the system portion or the boot portion to the first protected file; and
    executing the first instructions under control of the operating system kernel.

2. The method of claim 1, wherein
    the protected portion further includes a second protected file; and
    the method further comprises, subsequent to initiating execution of the operating system kernel, locating the second protected file via a second symbolic link to the second protected file, wherein the second symbolic link is stored in the other one of the system portion or the boot portion.

3. The method of claim 2, wherein the boot portion is not included in the protected portion.

4. The method of claim 1, further comprising:
    reading an access control policy stored in the nonvolatile memory which indicates the first symbolic link is not to be removed or modified by any user or indicates the first symbolic link is not to be removed or modified by a superuser;

wherein the operating system kernel is configured to enforce the access control policy.

5. The method of claim 4, further comprising:

detecting a violation or an attempted violation of the access control policy;

modifying a nonvolatile memory element included in the computing device in response to the detection of the violation or the attempted violation of the access control policy;

subsequent to the detection of the violation or the attempted violation of the access control policy, receiving a power on command for the computing device;

in response to the power on command, executing second instructions on the computing device, the second instructions causing the computing device to:
  determine whether the nonvolatile memory element has been modified; and
  in response to determining that the nonvolatile memory element has been modified, interrupting a boot procedure of the computing device.

6. The method of claim 1, further comprising:

determining whether a bootloader included in the nonvolatile memory is locked; and in response to determining that the bootloader is locked, and before initiating execution of the operating system kernel, verifying the boot portion;

wherein the execution of the operating system kernel is initiated in response to the boot portion being successfully verified.

7. The method of claim 1, wherein the first instructions provide a vendor radio interface layer (RIL).

8. A device comprising:

one or more processors; and a nonvolatile memory including a protected portion including a first protected file that includes first instructions, a system portion, a boot portion configured to cause the device to execute instructions included in the system portion under control of an operating system kernel included in the boot portion, and second instructions configured to cause the one or more processors to:
  verify the contents of the protected portion;
  in response to the protected portion being successfully verified, initiate execution of the operating system kernel on the computing device;
  subsequent to initiating execution of the operating system kernel, locate the first instructions via a first symbolic link to the first protected file, wherein the first symbolic link is stored in one of the system portion or the boot portion;
  create the first symbolic link in the system portion or the boot portion to the first protected file; and
  execute the first instructions under control of the operating system kernel.

9. The device of claim 8, wherein the protected portion further includes a second protected file; and the second instructions are further configured to cause the one or more processors to, subsequent to initiating execution of the operating system kernel, locate the second protected file via a second symbolic link to the second protected file, wherein the second symbolic link is stored in the other one of the system portion or the boot portion.

10. The device of claim 9, wherein the boot portion is not included in the protected portion.

11. The device of claim 8, wherein the second instructions are further configured to cause the one or more processors to:
  read an access control policy stored in the nonvolatile memory which indicates the first symbolic link is not to be removed or modified by any user or indicates the first symbolic link is not to be removed or modified by a superuser; and
  cause the operating system kernel to enforce the access control policy.

12. The device of claim 11, wherein the second instructions are further configured to cause the one or more processors to:
  detect a violation or an attempted violation of the access control policy;
  modify a nonvolatile memory element included in the device in response to the detection of the violation or the attempted violation of the access control policy;
  determine whether the nonvolatile memory element has been modified; and
  in response to determining that the nonvolatile memory element has been modified, interrupt a boot procedure of the computing device.

13. The device of claim 8, wherein the second instructions are further configured to cause the one or more processors to:
  determine whether a bootloader included in the nonvolatile memory is locked;
  in response to determining that the bootloader is locked, and before initiating execution of the operating system kernel, verify the contents of the boot portion;
  in response to determining that the bootloader is locked, require the boot portion be successfully verified prior to the initiation of the execution of the operating system kernel; and
  in response to the boot portion not being successfully verified, interrupt a boot procedure of the computing device.

14. The device of claim 8, wherein the first instructions provide a vendor radio interface layer (RIL).

15. A method of operating a computing device, the method comprising:

verifying the contents of a protected portion of a nonvolatile memory included in the computing device, the protected portion including a first protected file that includes first instructions;

in response to the protected portion being successfully verified, initiating execution of an operating system kernel, on the computing device, included in a boot portion of the nonvolatile memory, wherein the boot portion is configured to cause the computing device to execute instructions stored in a system portion of the nonvolatile memory under control of the operating system kernel, and the system portion is not included in the protected portion or the boot portion;

determining whether a bootloader included in the nonvolatile memory is locked;

in response to determining that the bootloader is locked, and before initiating execution of the operating system kernel, verifying the boot portion;

subsequent to initiating execution of the operating system kernel, locating the first instructions via a first symbolic link to the first protected file, wherein the first symbolic link is stored in one of the system portion or the boot portion; and executing the first instructions under control of the operating system kernel,
wherein the execution of the operating system kernel is initiated in response to the boot portion being successfully verified.

16. The method of claim 15, wherein
the protected portion further includes a second protected file; and
the method further comprises, subsequent to initiating execution of the operating system kernel, locating the second protected file via a second symbolic link to the second protected file, wherein the second symbolic link is stored in the other one of the system portion or the boot portion.

17. The method of claim 16, wherein the boot portion is not included in the protected portion.

18. The method of claim 15, further comprising:
causing the operating system kernel to create the first symbolic link in the system portion or the boot portion to the first protected file.

19. The method of claim 15, further comprising:
reading an access control policy stored in the nonvolatile memory which indicates the first symbolic link is not to be removed or modified by any user or indicates the first symbolic link is not to be removed or modified by a superuser;
wherein the operating system kernel is configured to enforce the access control policy.

20. The method of claim 19, further comprising:
detecting a violation or an attempted violation of the access control policy;
modifying a nonvolatile memory element included in the computing device in response to the detection of the violation or the attempted violation of the access control policy;
subsequent to the detection of the violation or the attempted violation of the access control policy, receiving a power on command for the computing device;
in response to the power on command, executing second instructions on the computing device, the second instructions causing the computing device to:
determine whether the nonvolatile memory element has been modified; and
in response to determining that the nonvolatile memory element has been modified, interrupting a boot procedure of the computing device.

* * * * *